US008096886B2

(12) United States Patent  
Kirschey

(10) Patent No.: US 8,096,886 B2  
(45) Date of Patent: Jan. 17, 2012

(54) TORSION-ELASTIC SHAFT COUPLING

(75) Inventor: Gerhard Kirschey, Wuppertal (DE)

(73) Assignee: Centa-Antriebe Kirschey GmbH, Haan (DE)

( * ) Notice: Subject to any disclaimer, the term of this patent is extended or adjusted under 35 U.S.C. 154(b) by 335 days.

(21) Appl. No.: 12/354,000

(22) Filed: Mar. 6, 2009

(65) Prior Publication Data

US 2009/0186707 A1    Jul. 23, 2009

(30) Foreign Application Priority Data

Jan. 18, 2008  (DE) .......................... 10 2008 005 257

(51) Int. Cl.  
 *F16D 3/68* (2006.01)

(52) U.S. Cl. ......................................................... 464/83

(58) Field of Classification Search .................... 464/71, 464/76, 81–83, 87–92; 440/52, 83  
See application file for complete search history.

(56) References Cited

U.S. PATENT DOCUMENTS

| | | | | |
|---|---|---|---|---|
| 4,385,893 A * | 5/1983 | Kirschey | ........................ | 464/76 |
| 5,205,788 A * | 4/1993 | Sacher et al. | | |
| 5,514,038 A * | 5/1996 | Harpin | ............................ | 464/71 |
| 5,522,747 A | 6/1996 | Kirschey | ......................... | 464/83 |
| 5,545,089 A | 8/1996 | Kirschey | ......................... | 464/83 |
| 6,244,964 B1 * | 6/2001 | Kirschey | ......................... | 464/76 |
| 2006/0172808 A1 | 8/2006 | Nakagawa | ...................... | 464/51 |

FOREIGN PATENT DOCUMENTS

| | | |
|---|---|---|
| DE | 2630506 | 1/1978 |
| DE | 102006045614 | 4/2008 |
| EP | 902204 * | 3/1999 |

* cited by examiner

*Primary Examiner* — Gregory Binda  
*Assistant Examiner* — Josh Skroupa  
(74) *Attorney, Agent, or Firm* — Andrew Wilford

(57) ABSTRACT

A shaft coupling has an input element adapted to be rotationally driven about an axis, an output element rotatable about the axis adjacent and limitedly relative to the input element, and an intermediate element rotatable about the axis adjacent and limitedly relative to both the input element and the output element. A first coupling assembly with progressive resistance to torque is fixed between one of the input and output elements and the intermediate element. A second coupling assembly with linear resistance to torque is fixed between the other of the input and output elements and the intermediate element such that torque is transmitted between the input and output elements through the coupling elements in series with each other in a single stage.

10 Claims, 5 Drawing Sheets

TORSION-ELASTIC SHAFT COUPLING

FIELD OF THE INVENTION

The present invention relates to a flexible shaft coupling. More particularly this invention concerns such a coupling adapted for use in a boat-propeller drive.

BACKGROUND OF THE INVENTION

A typical torsion-elastic shaft coupling intended for use as a boat drive has a input-side coupling flange normally connected directly or indirectly through a transmission to an engine output shaft and an output-side hub connected to the shaft carrying the propeller. Two torsionally elastic coupling elements are engaged between the flange and the hub to allow for some axial misalignment between the input side and output side and to absorb torque shocks.

Highly specific demands are made on torsion-elastic shaft couplings for maritime use, especially for boat drives. Especially, where torque is low, that is at low rpm in a boat drive, the shaft coupling should be decidedly torsion-elastic, a soft coupling. With increasing torque, that is at high rpm in a boat drive, a moderate torsionally rigidity is acceptable, a stiff coupling.

If the torsional elasticity of the coupling does not adequately take into account the applied torque, the danger exists of so-called tooth chatter in the transmission. This sound is generated by the disengaging of the tooth profiles from each other and subsequent reengaging when alternating torques are greater than the load torques. This issue exists especially during motor idle and under partial load in the transition between idle and working load. Apart from the annoyance of this noise, the separation of the tooth profiles from the gear teeth leads to a significant burden on the transmission resulting in increased wear.

The use of known one-stage couplings with a linear coupling element with linear torsional rigidity is not effective because coupling elements with linear torsional rigidity are not soft enough at low torque. The use of coupling elements with progressive torsional elasticity insures acceptable operation at low torque but at high torque such coupling elements may be too stiff. The term "linear" here means that the coupling counters a low input torque with the same resistance as a large input torque. The term "progressive" here means that the coupling offers resistance that increases as the input torque increases. Thus a linear-characteristic coupling will be stiff when torque is first applied and is low, and just as stiff when the torque increases to a high level. A progressive-characteristic coupling will be soft and not transmit force at low torque, when the system is starting up or at low speed, but will be quite stiff and transmit torque fully when the torque load is great.

As a result, up to the present two- and three-stage couplings have been used in boat drives. An example of a two-stage coupling is seen in U.S. Pat. No. 5,545,089 where a first elastic coupling stage in the form of a rubber roller coupling is connected between the hub and a coupling body of a claw coupling and an outer polygon loaded coupling body. The rubber roller coupling guarantees high torsional elasticity in partial-load operation, but is not adequately dimensioned for power transmission in full-load operation. When reaching a certain torque, therefore the second coupling stage designed as a claw coupling with high torsional rigidity engages.

An example of a three-stage coupling is seen in U.S. Pat. No. 5,522,747 where the roller coupling already known from the above-described publication is used as first coupling stage. It in turn is designed for partial-load operation and is largely torsion-elastic. When it reaches a certain rated torque, a more torsionally rigid claw coupling engages that is connected to a torsion-elastic third coupling stage.

With both types of coupling, it has so far been possible to keep tooth chatter under control. Nonetheless with increasing boat drive performance both coupling concepts have reached their limits. Essentially problematic is the transition when the first coupling stage reaches its performance limit and the next coupling stage begins with power consumption. It has also been shown that there are applications in which the second stage of the two-stage coupling must be more torsion-elastic at high torques.

It must be noted that the ordering terms of "first, second, third" with reference to coupling stages or coupling elements are basically used only for conceptual differentiation and do not compellingly define the serial order with regard to the force transmission within the presented shaft couplings.

OBJECTS OF THE INVENTION

It is therefore an object of the present invention to provide an improved torsion-elastic shaft coupling.

Another object is the provision of such an improved torsion-elastic shaft coupling that overcomes the above-given disadvantages, in particular that provides the lowest possible torsion elasticity over the entire torque and/or RPM range, especially of a boat drive.

SUMMARY OF THE INVENTION

A shaft coupling has according to the invention an input element adapted to be rotationally driven about an axis, an output element rotatable about the axis adjacent and limitedly relative to the input element, and an intermediate element rotatable about the axis adjacent and limitedly relative to both the input element and the output element. A first coupling assembly with progressive resistance to torque is fixed between one of the input and output elements and the intermediate element. A second coupling assembly with linear resistance to torque is fixed between the other of the input and output elements and the intermediate element such that torque is transmitted between the input and output elements through the coupling elements in series with each other in a single stage.

In order to solve the problem, the invention departs from the previous method of coupling construction. Instead of the self-evident more nuanced division into partial-load areas and the construction of a multi-stage coupling with one coupling part for each partial-load area, the problematic transition areas encountered in the engaging of the respective coupling stage are avoided by creating a single-stage coupling element.

In order to insure sufficiently high torsional elasticity at low torques, a progressive coupling element is used whose high torsional rigidity at high torques is significantly dampened at high torque by being combined with a linear coupling element. By connecting the two coupling elements in series the resulting torsional rigidity of the combination of both coupling element is always lower than the torsional rigidity of each individual coupling element. This guarantees over the entire RPM or torque range high torsional elasticity so that the separation of the profiles of the gear teeth can also be safely avoided in the critical partial-load area. In operation both coupling elements essentially contribute to total torsional elasticity. The low torsional rigidity at high torque leads to very low alternating torque in the coupling and gears. The result is very quiet operation and long service life of the drive train.

Due to the series connection of the progressive and linear coupling element both coupling elements are designed to carry the full rated torque of the drive. Due to its characteristic curve, a roller coupling is particularly suited as a progressive coupling element.

In addition, force can be transmitted axially or radially through the linear coupling element.

In order to create an axially most compact coupling, the progressive coupling element is provided at least partially inside the linear coupling element, or the linear coupling element is provided inside the progressive coupling element. Axial connection in series of the two coupling elements is also possible.

In an advantageous embodiment a central hub is provided with an array of radially outwardly open angularly spaced cavities and is surrounded by a ring provided with radially inwardly open angularly spaced outer cavities corresponding to the inner cavities, two mutually corresponding cavities forming a space for a respective elastomeric roller body of the roller coupling, especially if the ring form a radially outwardly projecting collar with an axially directed face that confronts a similar face of a drive-side coupling flange. An elastomeric body is between and vulcanized to these faces.

This way, the progressive coupling element in the form of a roller coupling and the linear coupling element in the form of an elastomeric ring are nested together to form an axially compact coupling. In this case, force is transmitted axially through the linear coupling element.

Alternatively, the ring can comprise a radially outwardly directed face that confronts a radially inwardly directed face of the coupling flange. An elastomeric body is again between and bonded to these two faces. Instead of vulcanization to the outer ring, it can be connected in a form-fitting way using gear-like teeth with or without prestress with the annular elastomeric body. This method permits realization of a torsion-elastic shaft coupling with radial force transmission.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
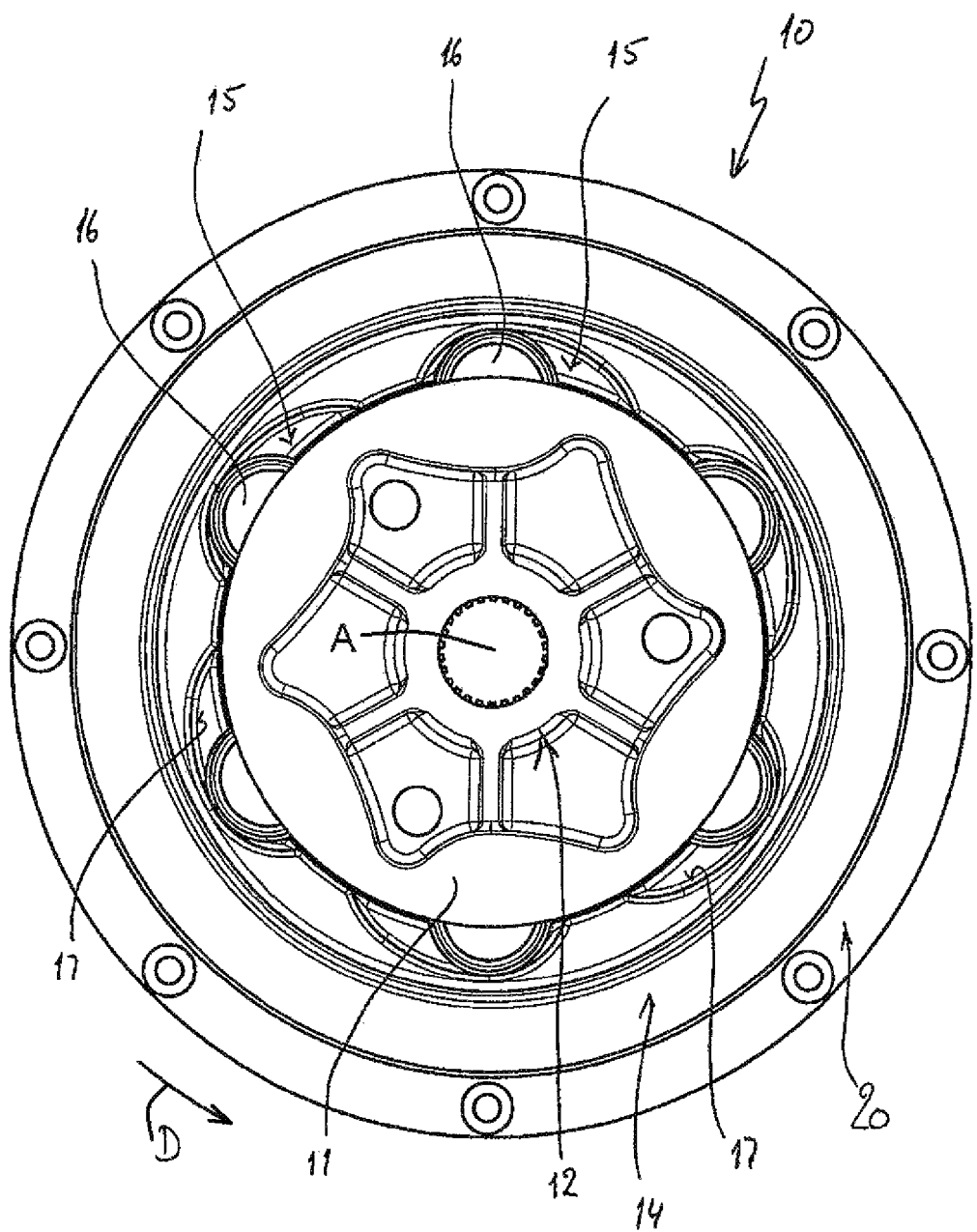
FIG. 1 is an axial end view of the coupling according to the invention from the output side.
Figure 2:
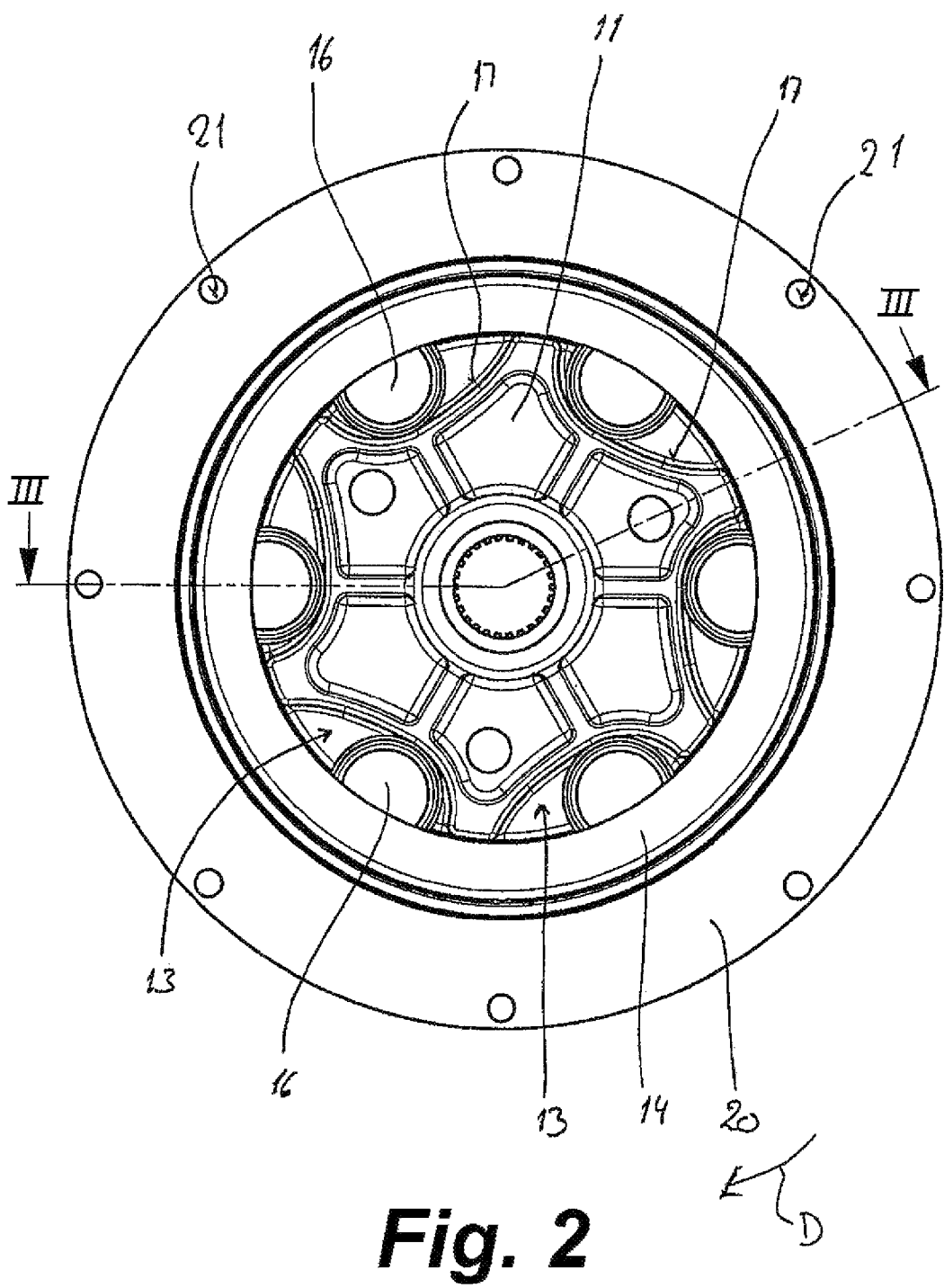
FIG. 2 is an axial end view of the chuck from the input side.
Figure 3:
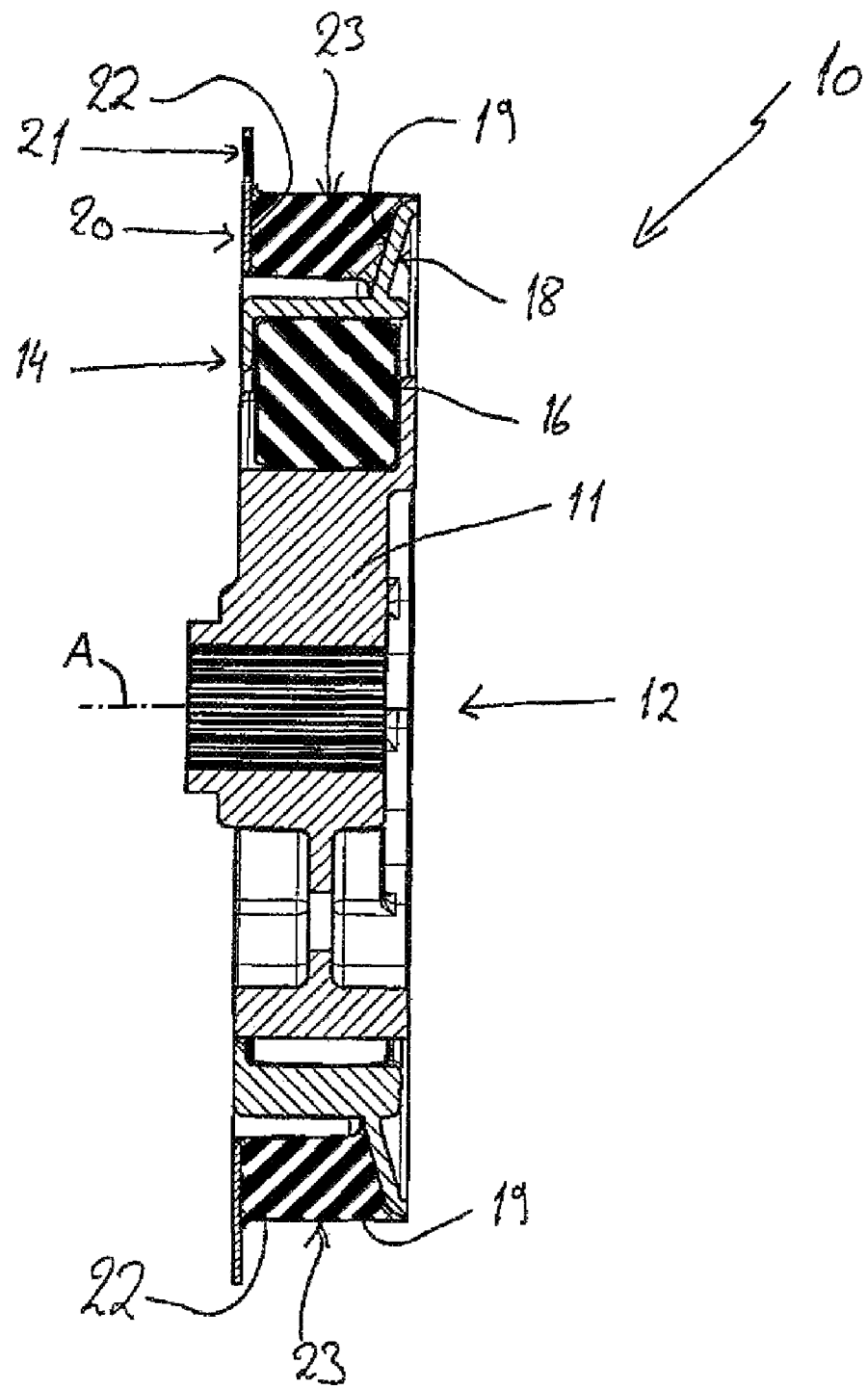
FIG. 3 is a section taken along line III-III of FIG. 2.

As seen in FIGS. 1-3 a torsion-elastic shaft coupling 10 has a central disk-shaped body 11 that is centered on an axis A and that forms a central hub 12 for an unillustrated output shaft for instance connected to a boat propeller. Thus the body 11 is the output element of the coupling 10. A radial outwardly directed surface of the disk 11 forms an array of outwardly open inner cavities 13 as shown best in FIG. 2 and each formed by a family of straight lines parallel to the axis A.

A ring 14 also centered on the axis A spacedly coaxially surrounds the disk 11 and is formed with an array of radially inwardly open outer cavities 15 similar to and each opening toward a respective one of the inner cavities 13. The radially confronting inner and outer cavities 13 and 15 form spaces for respective elastomeric roller bodies 16 of cylindrical shape. The diameter of each elastic roller body 16 can be the same, slightly smaller or slightly greater than the maximum radial space between the inner surfaces 17 of the respective inner and outer cavities 13 and 15. Here there are six inner cavities 13 and six outer cavities 15.

Like a classical roller coupling, the sole purpose of the roller bodies 16 is the transmission of torque to be applied by the ring 14 to the central hub 12. Without the roller bodies 16 inside the bearing shells created by the cavities 13 and 15 there would be no force transfer from the ring 14 to the central disk 11.

FIGS. 1 and 2 show how the cavities 13 and 15 in the central disk 11 and ring 14 have asymmetrical circumferences. Relative to a rotation direction D in which the outer ring 14 rotates relative to the disk 11, the cavities 13 have a steep trailing flank and a shallow leading flank while the cavities 15 have a shallow trailing flank and a steep leading flank. Since the outer ring 14 is, as described below, connected to the input element, when the coupling is running under load, that is with something connected to the disk 11 that impedes its rotation, the rollers 16 will be pushed against the steep front flanks of the cavities 13 and then rearward opposite the direction D against the shallow rear flanks of the cavities 15. During such shifting of course the coupling will be fairly soft, meaning that the disk 11 and ring 14 will easily shift angularly limitedly relative to each other. Only when there is relatively little resistance to rotation of the parts 11 and 14 relative to each other will the rollers 16 be sitting in the deepest parts of the cavities 13 and 15 against the steeper flanks thereof, in the position shown in FIGS. 1 and 2. Only when there is output-side resistance will the rollers be shifted toward the shallower flanks and thus compressed, offering increasing resistance to relative rotation of the two parts 11 and 14 until further relative movement becomes impossible.

In the first embodiment of the invention according to FIG. 3, the outer ring 14 has a radially outwardly projecting frustoconical collar 18 with a face 19 directed mainly axially toward an annular and planar face 22 of a coupling flange 20 that extends perpendicular to the axis A. The coupling flange 20 is bolted through holes 21 to a prime mover, for example a motor flywheel, and therefore constitutes the input element of the coupling. An annular elastomeric coupling body 23 is vulcanized to the faces 19 and 22.

The torsion-elastic shaft coupling 10 described above therefore comprises two coupling elements. The first coupling element is formed by the rollers 16 and has a progressive torsional rigidity. The advantage of this first coupling element consists primarily in its high torsional elasticity at low torques. More particularly, torsional vibrations are very well handled and damped by the roller coupling in the lower torque range.

In order to avoid the high coupling rigidity or stiffness at high torque, more than the roller coupling's progressive torsional elasticity characteristic curve which results in a slight dampening effect and can therefore generate high alternating torques, the second coupling element with linear torsional elasticity characteristic curve is connected to the roller coupling in series. In this embodiment, this is the annular coupling element 23.

Figure 4:
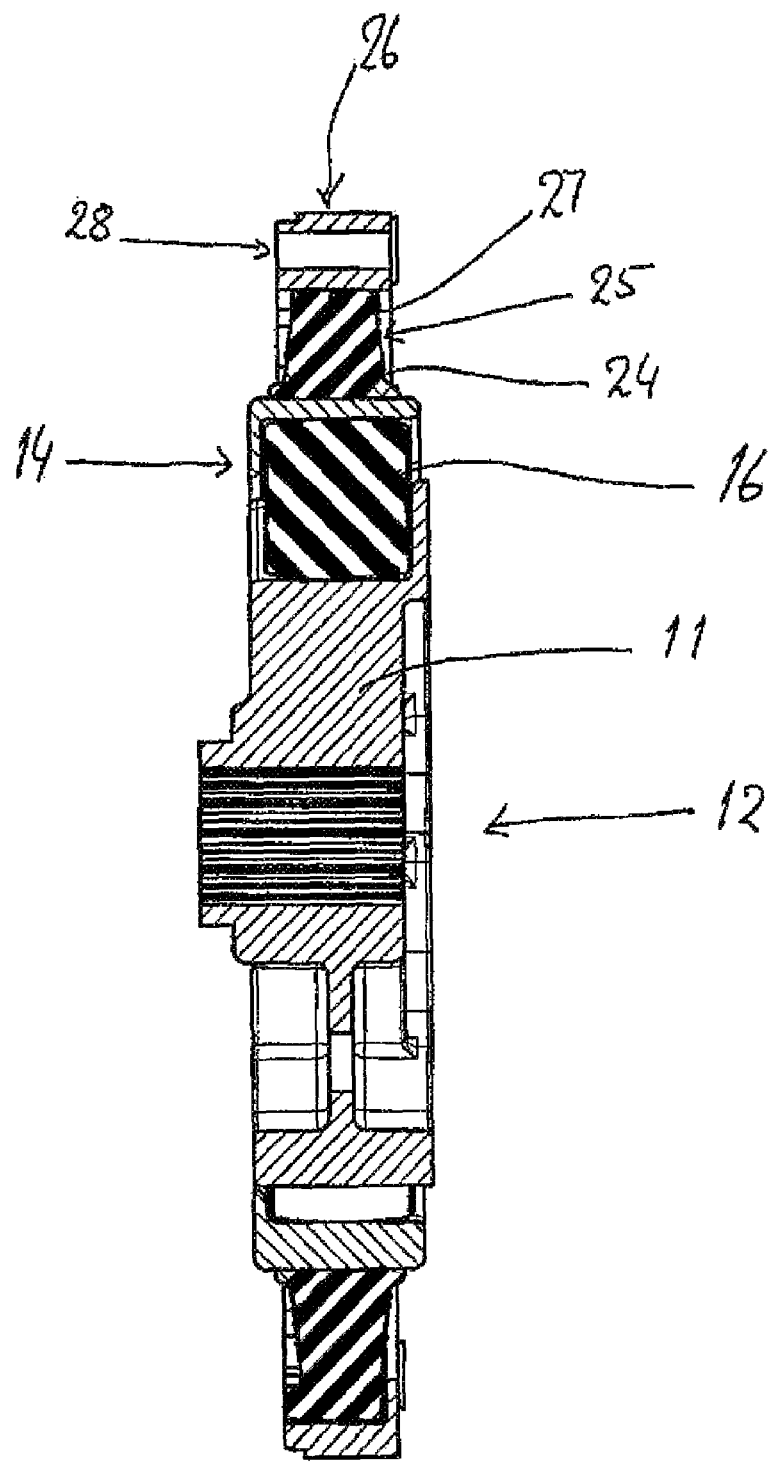
FIG. 4 is a view like FIG. 3 of an alternative coupling according to the invention.

FIG. 4 shows a cross-section of an alternative design of the inventive torsion-elastic shaft coupling 10. This is a coupling with radial force transmission through the coupling element with a linear torsional elasticity characteristic curve. Identical components are labeled with identical reference numbers, whereby the previous drawing description largely applies also for the embodiment of the invention according to FIG. 4.

Unlike the embodiment of FIGS. 1 to 3, however, the ring 14 has a radially outwardly directed surface 24 on which an annular elastomeric coupling body 25 is vulcanized. This annular coupling body 25 is surrounded by a coupling flange 26 with a radially inwardly directed surface 27 to which the outer edge of the body 25 is vulcanized, so it is torsionally connected by the body 25 to the ring 14. Alternatively, this connection can be made by another type of form-fit joint. The coupling flange 26 can be connected to a drive-side flywheel using axial holes 28.

Exactly as in the embodiment according to FIGS. 1 to 3 here the roller coupling effective at low torques with progressive torsional elasticity characteristic curve is connected in series with the annular coupling body 25 with a linear torsional elasticity characteristic curve. Unlike the embodiment according to FIG. 3, the force transmission in the embodiment according to FIG. 4 is radial in nature.

It is essential to the invention that the present torsionelastic shaft coupling is a single-stage coupling. Both coupling elements, that is, the roller coupling as well as the annular coupling bodies 25 and 23 are configured for full rated torque of the drive and act simultaneously in every condition of power transmission. Also, in every operating condition every coupling element transmits torque for itself fully and simultaneously with the other coupling element. Only the respective share of the resulting total torsional elasticity changes with increasing torque. However, unlike two-stage and multi-stage couplings this takes place dynamically and without a transition area in which with stage couplings the torsional elasticity of the one stage is almost exhausted and that of the other stage is not sufficient enough.

Figure 5:
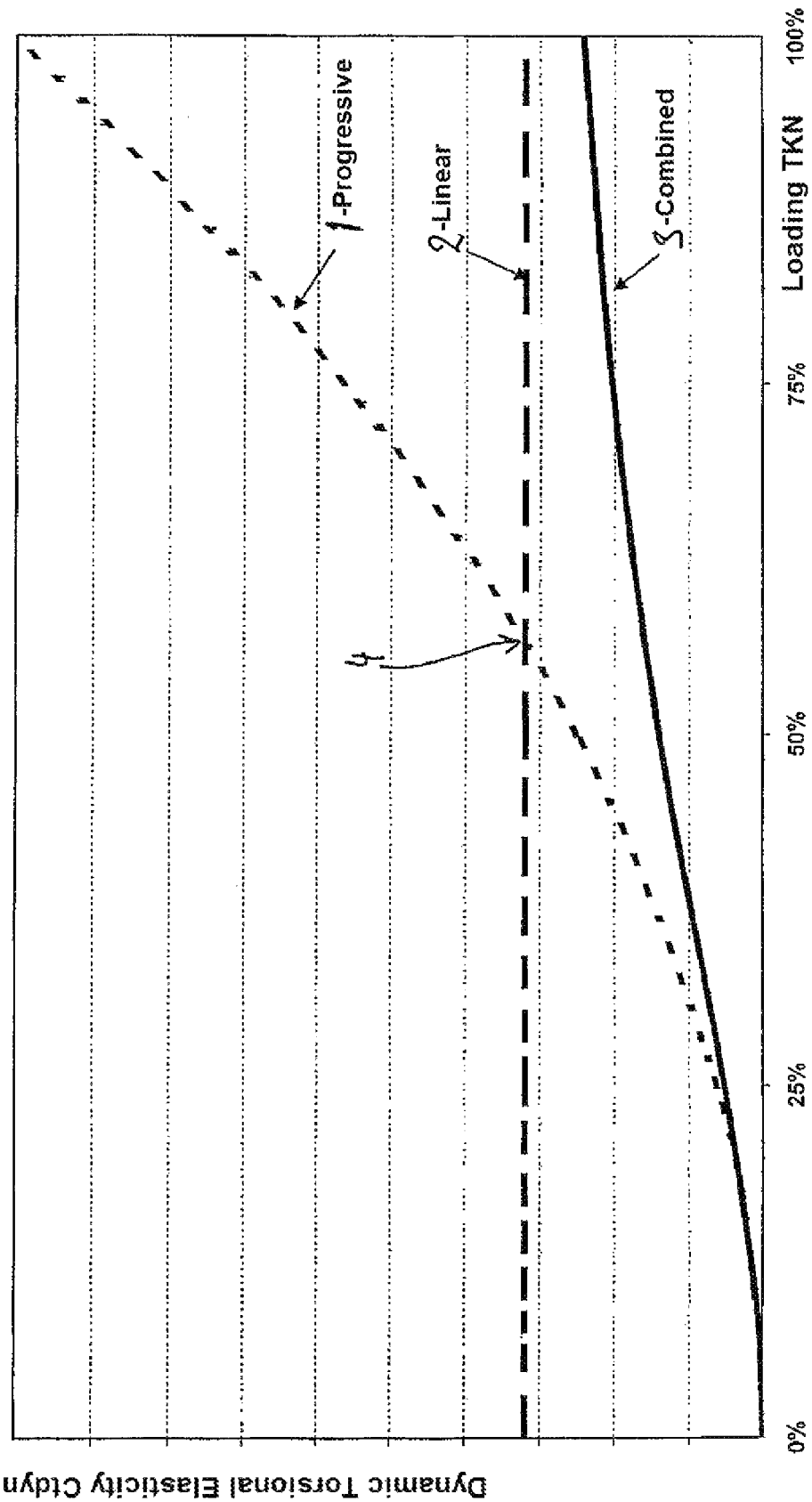
FIG. 5 is a graph illustrating operation of the coupling in accordance with the invention.

FIG. 5 shows three torsional elasticity characteristic curves of different couplings. Curve 1 is that of a progressive coupling, for example, of the roller coupling alone. As shown by the drawing, this is well suited to absorbing torsional vibrations at low torques. In these areas it is very soft and therefore highly torsion-elastic.

Curve 2 is characteristic of a coupling with linear torsional elasticity. for example coupling bodies 23 and 25. This crosses the progressive characteristic curve 1 at 4 at a certain coupling load (in this example, at about 55%). Consequently, the torsional elasticity of a linear coupling with characteristic curve 2 is higher up to this crossing 4. For this reason, up to the present multi-stage couplings were selected above a certain relatively low torque at one shifted from the first coupling stage to a second coupling stage.

Curve 3 is characteristic of a torsion-elastic shaft coupling 10 that combines the response shown by the characteristic curve 1 and that of the characteristic curve 2, but in series, in other words the system of this invention. The resulting characteristic curve 3 is below the characteristic curve 2 of the linear coupling element and approaches this characteristic curve asymptotically. This is explained by the fact that for every applied torque both coupling elements function. It is therefore always the case that the results from both torsional elasticities and this resulting torsional elasticity is always lower than the torsional elasticity of the individual couplings, even lower than that of the individual coupling with the lowest torsional elasticity.

I claim:
1. A shaft coupling comprising
an input element adapted to be rotationally driven about an axis;
an output element rotatable about the axis adjacent and limitedly relative to the input element;
an intermediate element rotatable about the axis adjacent and limitedly relative to both the input element and the output element;
a first coupling assembly with progressive resistance to torque fixed between one of the input and output elements and the intermediate element; and
a second coupling assembly with linear resistance to torque fixed between the other of the input and output elements and the intermediate element such that the full torque transmitted between the input and output elements passes through each of the coupling assemblies in series with each other.

2. The shaft coupling defined in claim 1 wherein the first coupling assembly includes a plurality of rollers.

3. The shaft coupling defined in claim 1 wherein the second coupling assembly includes a pair of relatively rotatable and axially spaced parts and an elastomeric body joined to and between the parts.

4. The shaft coupling defined in claim 1 wherein one of the coupling assemblies is surrounded radially by the other of the coupling assemblies.

5. The shaft coupling defined in claim 4 wherein the first coupling assembly includes:
a disk forming the one of the input and output elements and formed with an array of angularly spaced and radially outwardly open cavities;
a ring forming the intermediate element and formed with an array of angularly spaced and radially inwardly open cavities each radially confronting and forming a space with a respective one of the cavities of the disk; and
respective elastomeric rollers in the spaces.

6. The shaft coupling defined in claim 5 wherein the cavities of one of the arrays have relative to a predetermined rotation direction about the axis a steep leading flank and a shallow trailing flank, whereby the respective rollers are compressed radially as they shift angularly in the cavities from the respective steep flank toward the respective shallow flank.

7. The shaft coupling defined in claim 5 wherein the cavities of one of the arrays have relative to a predetermined rotation direction about the axis a shallow leading flank and a steep trailing flank, whereby the respective rollers are compressed radially as they shift angularly in the cavities from the respective steep flank toward the respective shallow flank.

8. A shaft coupling comprising
an input element adapted to be rotationally driven about an axis;
an output element rotatable about the axis adjacent and limitedly relative to the input element;
an intermediate element rotatable about the axis adjacent and limitedly relative to both the input element and the output element;
a first coupling assembly with progressive resistance to torque fixed between one of the input and output elements and the intermediate element; and
a second coupling assembly with linear resistance to torque fixed between the other of the input and output elements and the intermediate element such that torque is transmitted between the input and output elements through the coupling elements in series with each other, the second coupling assembly including a pair of relatively rotatable and radially spaced parts and an elastomeric body joined to and between the parts.

9. A shaft coupling comprising
an input element adapted to be rotationally driven about an axis;

an output element rotatable about the axis adjacent and limitedly relative to the input element;

an intermediate element rotatable about the axis adjacent and limitedly relative to both the input element and the output element;

a first coupling assembly with progressive resistance to torque fixed between one of the input and output elements and the intermediate element; and a second coupling assembly with linear resistance to torque fixed between the other of the input and output elements and the intermediate element such that torque is transmitted between the input and output elements through the coupling elements in series with each other, the other of the input and output elements having an axially directed annular face and the intermediate element having an axially directed annular face confronting the face of the other of the input and output elements, the second coupling assembly comprising an elastomeric body joined to and between both of the faces.

10. A shaft coupling comprising an input element adapted to be rotationally driven about an axis;

an output element rotatable about the axis adjacent and limitedly relative to the input element;

an intermediate element rotatable about the axis adjacent and limitedly relative to both the input element and the output element;

a first coupling assembly with progressive resistance to torque fixed between one of the input and output elements and the intermediate element; and a second coupling assembly with linear resistance to torque fixed between the other of the input and output elements and the intermediate element such that torque is transmitted between the input and output elements through the coupling elements in series with each other, the other of the input and output elements has a radially inwardly directed annular face and the intermediate element has a radially outwardly directed annular face confronting the face of the other of the input and output elements, the second coupling assembly comprising an elastomeric body joined to and between both of the faces.

* * * * *